Patented Aug. 29, 1944

2,356,973

UNITED STATES PATENT OFFICE 2,356,973

RUBBER HYDROCHLORIDE

Albert M. Clifford, Stow, Ohio, assignor to Wingfoot Corporation, Akron, Ohio, a corporation of Delaware No Drawing. Application July 7, 1939, Serial No. 283,229

8 Claims. (Cl. 260—735)

This invention relates to the stabilization of rubber hydrohalides such as rubber hydrochloride by the addition thereto of photochemical inhibitors. More particularly, it relates to the use of certain substituted piperazines which are substantially permanent and non-blooming and act as plasticizers for the rubber hydrohalide in addition to preventing its deterioration.

Rubber hydrohalides, such as rubber hydrochloride, have been known for many years but have become commercially available only recently. For some uses of these materials and particularly where they are subject to sources of ultra violet light such as sunlight, it is necessary to stabilize them against the deteriorating effect of such light in order that they may be practically employed. It is the purpose of the present invention to provide new and improved age-resisters or photochemical inhibitors for use in rubber hydrohalides. It is a further object of the invention to provide new and improved rubber hydrohalide compositions containing such inhibitors. Other objects and advantages will appear as the description of the invention proceeds. The invention is particularly applicable to rubber hydrochloride and will be described in connection therewith.

It has been known previously that rubber hydrohalides, such as rubber hydrochloride, are subject to photochemical deterioration. Materials are known which will retard or inhibit this effect. Many of these materials, however, possess certain inherent disadvantages and limitations. For example, some of them are fugitive so that the inhibitor is lost with the passage of time and its inhibiting effect with it. Other materials, either because of their physical form or by reason of their low solubility in the rubber hydrochloride, tend to bloom or blush, forming a crystalline or oily deposit on the surface of the rubber hydrochloride.

Plasticizers are desirable components of rubber hydrohalide mixes for the manufacture of many articles, particularly in the form of film, which are normally exposed to sunlight, e. g., window curtains, wrapping materials, etc., in order to give a softer "feel" to the rubber hydrohalide and increase its tear resistance. The preferred inhibitors of this invention are, therefore, those which are compatible with plasticized films or other structures of rubber hydrohalides and do not form a bloom on such material on standing or ageing. The preferred plasticizers for such use are butyl stearate or other alkyl esters of fatty acids, dibutyl phthalate or other alkyl esters of phthalic acid or a hydrogenated phthalic acid, and ethyl abietate or other ester of an acid derived from a vegetable oil. Suitable plasticizers are propyl stearate, amyl stearate, hexyl stearate, heptyl stearate, decyl stearate, cyclohexyl stearate, glycol stearate, glyceryl stearate, ethyl oleate, butyl oleate, heptyl oleate, butyl palmitate, the propyl, amyl, heptyl, octyl, etc. esters of phthalic and hydrogenated phthalic acids, tributyl phosphate, triphenyl phosphate, and triphenyl thiophosphate. Such plasticizers, which impart tear-resistance to rubber hydrohalides, are described in U. S. 2,153,954.

The materials of the present invention are very effective photochemical inhibitors and, in addition, overcome many of the disadvantages inherent in some of the previously known inhibitors. Furthermore, the compounds of the invention, as a class, possess high solubility in the rubber hydrochloride and, in the preferred species, exert marked plasticizing effect so that they may be employed both for their inhibiting effect and to replace all or part of the plasticizers which might otherwise be necessary.

The compounds which, according to the invention, have been found to be useful as inhibitors are certain substituted piperazines which may be illustrated by the structural formula

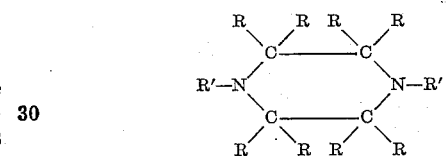

in which R' is selected from the group consisting of aliphatic, aralkyl, furfuryl and tetrahydrofurfuryl radicals and R is selected from the group consisting of aliphatic, aralkyl, furfuryl and tetrahydrofurfuryl radicals and hydrogen. The various substituents may be the same or different. The aliphatic radicals include straight chain radicals such as n-octyl, branched chain radicals such as 3-ethylheptyl and unsaturated radicals such as allyl. A typical aralkyl radical is the benzyl radical. Cycloaliphatic or alicyclic radicals are not included since piperazines containing these as substituents are characteristically crystalline, even in the lower members of the class, and are generally less soluble in rubber hydrochloride than are the compounds of the present invention. The strictly hydrocarbon radicals are preferred but compounds operable in the invention are also obtained using radicals containing hydroxyl, alkoxy, aryloxy, halogen, amino and other substantially neutral or basic substituents. The alkyl radicals constitute a particularly preferred class.

When R' is an alkyl radical, it is preferred that the radical contain at least three carbon atoms since such compounds possess a higher degree of permanency. As the number of carbon atoms in the alkyl radical increases, there is ultimately some diluent effect whereby a given weight of the inhibitor has a lessened effect. Thus, although larger groups may be employed, alkyl radicals containing from five to twelve carbon atoms constitute a particularly preferred class, piperazines containing such substituents on the nitrogen atoms possessing good solubility in the rubber hydrochloride and generally exerting marked plasticizing effect.

The compounds of the invention may be prepared by various procedures. Thus, two mols of a primary amine may be reacted with one mol of ethylene dibromide to produce one mol of an N,N'-disubstituted ethylenediamine, two mols of hydrobromic acid being split off. This N,N'-disubstituted ethylenediamine may then be reacted with ethylene dibromide in equimolecular proportions to produce N,N'-disubstituted piperazine with the formation of more hydrogen bromide. These stepwise reactions may be represented by Equations 1 and 2.

(1) $2R-NH_2 + Br-C_2H_4-Br \rightarrow R-NH-C_2H_4-NH-R + 2HBr$ (2) $R-NH-C_2H_4-NH-R + Br-C_2H_4-Br \longrightarrow$

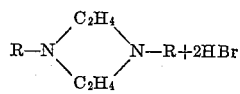

Also, the two steps of the reaction may be carried out concurrently, as represented by the following equation:

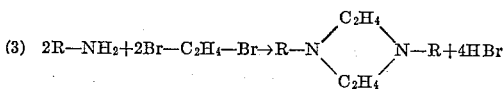

In all of the reactions illustrated, in which HBr is formed, the reaction may be promoted by the presence of a basic material such as sodium carbonate, sodium hydroxide, calcium oxide, calcium hydroxide, or other base which will absorb the HBr. Unless the HBr is thus absorbed, it will react with part of the primary amine to form the amine hydrobromide, thereby making that portion of the amine unavailable for the desired reaction.

An alternative process may be represented by the following equation:

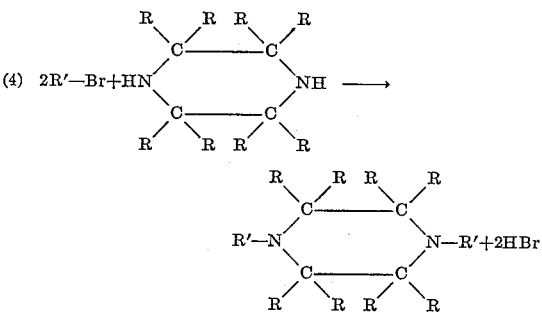

According to this process, one mol of, for example, a piperazine unsubstituted on the nitrogen atoms is reacted with two mols of aliphatic halide to produce one mol of N,N'-disubstituted piperazine with the splitting out of two mols of hydrogen halide. Several piperazines which may be employed in this method of preparation are commercially available and other suitable piperazines may be prepared by known methods. These piperazines include the parent compound, piperazine, and various ring-substituted piperazines which may be represented by the structural formula:

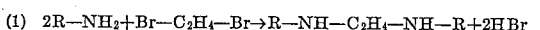
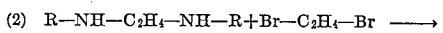

in which R is hydrogen or a radical selected from the group consisting of aliphatic, aralkyl, furfuryl and tetrahydrofurfuryl radicals.

The following example is illustrative of the method of preparing the inhibitors of the invention according to the reaction represented by Equations 1 and 2.

Example A

One mol (73 parts) of butylamine (B. P. 76–80°) was heated to its boiling point in a three-necked flask equipped with a stirrer, reflux condenser and separatory funnel. A half mol (94 parts) of ethylene dibromide was added through the separatory funnel over a period of 30 minutes. Exothermic reaction occurred, little external heating being required to keep the temperature at the reflux point. Near the end of the addition of the ethylene dibromide, the reaction mixture suddenly solidified, due to the formation of crystals of butylamine hydrobromide formed by reaction of the byproduct hydrogen bromide with unreacted butylamine. A 50% caustic solution, containing 45 parts of sodium hydroxide, was then added to take up the hydrogen bromide and free the butylamine for further reaction and the mixture was heated at 95° C. for another 30 minutes. The reaction mixture consisted of an aqueous layer and an organic layer which latter was separated and subjected to distillation to yield 21 parts of butylamine, 28 parts of N,N'-dibutyl ethylenediamine (B. P. 120–130° C. at 25 mm.) and 18 parts of N,N'-dibutyl piperazine (B. P. 155–160° C. at 5 mm.). The yield of N,N'-dibutyl piperazine was 36% of the theoretical.

The general procedure described in the foregoing example may be applied to produce other N,N'-disubstituted piperazines coming within the invention by replacing the butylamine of the example with other amines. With higher amines, reaction is facilitated by heating to a higher temperature. For example, with nonylamine, it has been found desirable to heat to about 160° C. before adding the ethylene dibromide. It has also been found desirable to add part of the caustic (about 20–30% of the total) when about 50–70% of the initial portion of ethylene dibromide has been added. Such added caustic absorbs the by-product hydrogen bromide before the crystallization described in Example A takes place and facilitates the desired reaction.

The alternative method of preparing the inhibitors of the invention as represented by Equation 4 above is illustrated by the following example.

Example B

One hundred eighty-two grams of "Stenol" (a commercial product which is a mixture of saturated fatty alcohols containing twelve and sixteen carbon atoms in the chains and has an average molecular weight of 260) were refluxed for four hours with 90 cc. of 48% hydrobromic acid and 20 cc. of concentrated sulfuric acid. The organic layer formed was separated, mixed with 45 cc. of 48% hydrobromic acid and 10 cc. of concentrated sulfuric acid and refluxed for two hours. The organic layer was separated, washed twice with hot water, and distilled to obtain 187 grams of material boiling at 195–250° C. at 5 mm. pressure. This material was a mixture of bromides corresponding to the alcohols in the starting material and may be called "Stenol" bromide. Forty-eight and a half grams of piperazine hexahydrate were heated with stirring to 100–110° C. in a three-necked flask equipped with a condenser, a stirrer, and a separatory funnel. Eighty grams of "Stenol" bromide were then added dropwise through the separatory funnel over a period of ten minutes followed by about eight cc. of 50% aqueous sodium hydroxide. This mixture was refluxed and another 80 grams of "Stenol" bromide were added and allowed to react for fifteen minutes. Then about 24 cc. of 50% aqueous sodium hydroxide were added and the mixture was refluxed for one hour. The organic layer formed solidified on cooling and was separated by filtration and washed successively with caustic solution and water. It was then dissolved in 500 cc. of hot alcohol and decanted from the insoluble material. On cooling, a white crystalline material was obtained. This was distilled. The main fraction, boiling at 275–350° C. at 3 mm. pressure, was suspended in about 300 cc. of hot alcohol, cooled, filtered and washed with acetone. The thus purified final product weighed 100 grams and melted at 79° C.

The foregoing examples are illustrative of the methods of preparing the inhibitors of the invention which may also be prepared by various modifications of these processes or by any other process. For example, the ethylene dibromide in Example A may be replaced by ethylene dichloride although, in this event, it will be desirable to conduct the reaction in an autoclave because of the lower boiling point of the ethylene dichloride.

Various other amines may be employed in place of the butyl amine of Example A to produce other N,N'-disubstituted piperazines useful in the invention. Representative examples of such amines are the amyl amines, the heptyl amines, the nonyl amines, the decyl amines, the dodecyl amines, allylamine, benzylamine, β-phenylethylamine, butoxymethylamine, p-hydroxybenzylamine, and the like.

When using the method of preparation illustrated by Example B, any aliphatic halide, such as the chloride or bromide corresponding to any of the foregoing amines may be employed in place of the "Stenol" bromide of the example. Also, various substituted piperazines may be employed in place of the piperazines of the example. Thus, N,N'-disubstituted piperazines may be prepared from 2,5-dimethylpiperazine; 2,3,5-trimethylpiperazine; 2-methyl-3-propylpiperazine; 2,5-dimethyl-3-ethylpiperazine; 2,3,5,6-tetramethylpiperazine; 2,5-di(isopropyl) piperazine; 2,3-di(isobutyl) piperazine; 2,5-di(isobutyl) piperazine; 2-benzyl-5-isopropylpiperazine; 2-isobutyl-5-isopropylpiperazine; 2-isopropyl piperazine; 2,2,5,5-tetraethylpiperazine; 2-isobutylpiperazine and any other piperazine having the structural formula

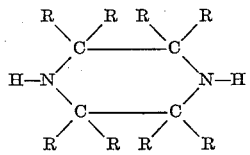

Representative examples of the materials of the invention were incorporated into rubber hydrochloride and samples in the form of thin films were exposed to artificial sunlight in a Fadeometer and to natural sunlight to determine the relative life of the protected film as compared with the life of a control containing no photochemical inhibitor but otherwise identical. A number of the materials tested and the results obtained are listed in the following tables. Three formulations were employed—#1 contained no plasticizer; #2 contained 7½% dibutyl phthalate and 2½% butyl stearate (based on the weight of rubber hydrochloride); #3 contained 10% dibutyl phthalate. These same numbers are used in Table II below to indicate the formulations used with particular photochemical inhibitors in the tests. The inhibitors used in the tests are listed in Table I.

*Table I*

A.—N,N'-dibutyl piperazine
B.—N,N'-diamyl piperazine (B. P. 170–180° C. @ 5 mm.)
C.—N,N'-di(3-ethyl heptyl) piperazine (B. P. 210° @ 5 mm.)
D.—N,N'-dibenzyl piperazine (M. P. 90° C.)
E.—N,N'-"Ocenol" piperazine (B. P. >225° C. @ 4 mm.)
F.—N,N'-"Lorol" piperazine (B. P. 230–300° C. @ 5 mm.; M. P. 42° C.)
G.—N,N'-di(n-octyl) piperazine (B. P. 200–210° C. @ 4 mm.)
H.—N,N'-"Stenol" piperazine (B. P. 275–300° C. @ 3 mm.; M. P. 79° C.)

"Sperzo," "Lorol," "Ocenol" and "Stenol" are trade names applied to commercially available mixtures of higher alcohols. "Sperzo" contains approximately 35% lauryl alcohol, 20–25% myristol and 40–45% of cetyl and n-octadecyl alcohols, the average molecular weight of the mixture being about 200. "Lorol" has substantially the same composition as "Sperzo" and is described by the manufacturer as a mixture of saturated fatty alcohols having 12, 14, 16 and 18 carbon atoms in the chains in which those having 12 and 14 carbon atoms predominate. "Ocenol" (which has an iodine number of 80–85) is a mixture of octadecen-9-ol-1 and n-octadecyl alcohol. As these terms are applied to Examples E, F and H in Table I they indicate mixtures of piperazines formed by converting these commercial mixtures of alcohols to the corresponding bromides and reacting these mixed bromides with piperazine according to the general method illustrated by Example B. As shown by the testing data, such mixtures may be employed as inhibitors without separation into components.

*Table II*

| Sample and formula | Percent of inhibitor | Life as percent of control | |
|---|---|---|---|
| | | Fadeometer | Florida sunshine |
| A-1 | 7½ | 423 | >380 |
| A-1 | 10 | 260 | |
| A-2 | 5 | 108 | 145 |
| A-2 | 7½ | 108–160 | 120–240 |
| A-2 | 10 | 108 | 145 |
| A-3 | 7½ | 217 | 270 |
| B-1 | 10 | 260 | |
| C-1 | 7½ | 312 | 332 |
| C-2 | 7½ | 175 | 283 |
| C-3 | 7½ | 218 | 302 |
| D-1 | 7½ | 187 | 235 |
| D-2 | 5 | 200 | 315 |
| D-2 | 7½ | 200–243 | 283–300 |
| D-3 | 7½ | 202 | 270 |
| E-3 | 7½ | 148 | |
| F-3 | 7½ | 151 | |
| G-3 | 7½ | 210 | |
| H-3 | 7½ | 165 | |

It will be seen from these data that the materials of the invention are very effective photochemical inhibitors for rubber hydrohalides such as rubber hydrochloride. Moreover, as a class, these materials are relatively more permanent than previously known inhibitors, this improvement being particularly noticeable in film containing added plasticizers such as butyl stearate and dibutyl phthalate, and the preferred species have marked plasticizing power.

What I claim is:

1. Rubber hydrochloride containing a minor proportion of an N,N'-dialiphatic piperazine.

2. Rubber hydrochloride containing a minor proportion of an N,N'-dialkyl piperazine.

3. Rubber hydrochloride containing a minor proportion of an N,N'dialkyl piperazine in which each of the alkyl groups contains at least three carbon atoms.

4. Rubber hydrochloride containing a minor proportion of N,N'-dialkyl piperazine in which each of the alkyl groups contains five to twelve carbon atoms.

5. Rubber hydrochloride containing a minor proportion of an N,N'-diaralkyl piperazine.

6. A film comprising rubber hydrochloride and a plasticizer which increases the tear-resistance of the film and a minor proportion of an N,N'-dialiphatic piperazine sufficiently compatible with the plasticized rubber hydrochloride so that it forms no appreciable "bloom" on standing.

7. Rubber hydrochloride containing a minor proportion of a compound having the structural formula

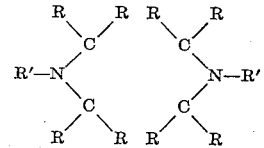

in which R' is selected from the group consisting of aliphatic, aralkyl, furfuryl and tetrahydrofurfuryl radicals and R is selected from the group consisting of aliphatic, aralkyl, furfuryl and tetrahydrofurfuryl radicals and hydrogen.

8. A film comprising rubber hydrochloride and a plasticizer which increases the tear-resistance of the film and a minor proportion of a piperazine having the formula

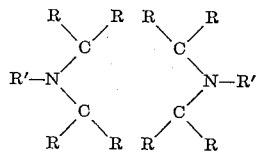

in which R' is selected from the group consisting of aliphatic, aralkyl, furfuryl and tetrahydrofurfuryl radicals and R is selected from the group consisting of aliphatic, aralkyl, furfuryl and tetrahydrofurfuryl radicals and hydrogen, such piperazine being sufficiently compatible with the plasticized rubber hydrochloride so that it forms no appreciable "bloom" on standing.

ALBERT M. CLIFFORD.

Certificate of Correction

Patent No. 2,356,973.　　　　　　　　　　　　　　　　　　　　　　　August 29, 1944.

ALBERT M. CLIFFORD

It is hereby certified that errors appear in the printed specification of the above numbered patent requiring correction as follows: Page 1, first column, line 13, for the word "subject" read *subjected*; page 2, first column, line 65, strike out ", for example," and insert the same before "aliphatic" in line 67, same page and column; page 4, second column, lines 3 to 8 and lines 18 to 23, claims 7 and 8 respectively, strike out the formula in each instance and insert instead the following—

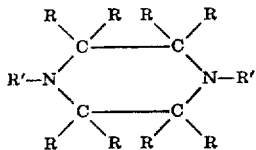

and that the said Letters Patent should be read with these corrections therein that the same may conform to the record of the case in the Patent Office.

Signed and sealed this 23rd day of January, A. D. 1945.

[SEAL]

LESLIE FRAZER,
　　　　　　　　　　　　　　　　　　　　　　　*Acting Commissioner of Patents.*